United States Patent
Boucher et al.

(10) Patent No.: US 11,746,514 B2
(45) Date of Patent: Sep. 5, 2023

(54) FLUSH VALVE AND MOTOR ALIGNMENT BRACKET

(71) Applicant: Zurn Industries, LLC, Milwaukee, WI (US)

(72) Inventors: Keith Roger Boucher, Apex, NC (US); Chadwick Brice Williams, Apex, NC (US); Alan Kaid, Apex, NC (US); Daniel Steven Hoel, Apex, NC (US)

(73) Assignee: Zurn Industries, LLC, Milwaukee, WI (US)

( * ) Notice: Subject to any disclaimer, the term of this patent is extended or adjusted under 35 U.S.C. 154(b) by 0 days.

(21) Appl. No.: 17/334,156

(22) Filed: May 28, 2021

(65) Prior Publication Data
US 2021/0372109 A1  Dec. 2, 2021

Related U.S. Application Data

(60) Provisional application No. 63/032,435, filed on May 29, 2020.

(51) Int. Cl.
*E03D 1/34* (2006.01)
*F16K 21/16* (2006.01)
*F16K 31/04* (2006.01)

(52) U.S. Cl.
CPC .............. *E03D 1/34* (2013.01); *F16K 21/16* (2013.01); *F16K 31/047* (2013.01)

(58) Field of Classification Search
CPC .......... F16K 21/16; F16K 31/047; E03D 1/34
See application file for complete search history.

(56) References Cited

U.S. PATENT DOCUMENTS

| | | | | |
|---|---|---|---|---|
| 2,299,802 A | * | 10/1942 | Daniels | F16K 3/34 137/625.29 |
| 6,102,016 A | * | 8/2000 | Sitar | F02M 26/67 251/129.13 |
| 7,140,050 B2 | * | 11/2006 | Muderlak | E03D 5/10 4/405 |
| 7,510,166 B2 | * | 3/2009 | Maercovich | E03D 5/10 4/304 |
| 7,946,504 B2 | * | 5/2011 | Shapira | G05D 23/1393 236/12.12 |
| 7,946,555 B2 | * | 5/2011 | Ikeda | F02D 9/105 324/207.25 |
| 10,578,228 B2 | | 3/2020 | Block et al. | |
| 10,634,101 B2 | * | 4/2020 | Bartolotta | F02M 26/58 |
| 2008/0308079 A1 | * | 12/2008 | Albert | F16K 3/10 251/303 |

(Continued)

*Primary Examiner* — Daphne M Barry
(74) *Attorney, Agent, or Firm* — Husch Blackwell LLP

(57) ABSTRACT

A flush valve assembly including a manifold including an inlet, an outlet, and a fluid passageway positioned between the inlet and the outlet, a motor coupled to the manifold and including a drive gear, a valve cartridge coupled to the manifold, and a shaft extending from the valve cartridge. The shaft includes a valve gear configured to mesh with the drive gear. Rotational motion from the motor is transferred through the drive gear, the valve gear, and the valve shaft to rotate the valve cartridge between a first position and a second position. The flush valve assembly additionally includes a bracket removably coupled to the manifold. The bracket is configured to align the drive gear and the valve gear in a predetermined position.

19 Claims, 8 Drawing Sheets

(56) References Cited

U.S. PATENT DOCUMENTS

| | | | |
|---|---|---|---|
| 2014/0319729 A1* | 10/2014 | Galati | B29C 45/281 |
| | | | 425/166 |
| 2017/0198784 A1* | 7/2017 | Soubjaki | H02K 7/116 |
| 2018/0241282 A1* | 8/2018 | Niekamp | F02M 35/10157 |
| 2019/0107224 A1* | 4/2019 | Block | F16K 21/12 |
| 2020/0300344 A1* | 9/2020 | Matsuto | F16H 25/2204 |

* cited by examiner

FLUSH VALVE AND MOTOR ALIGNMENT BRACKET

CROSS-REFERENCE TO RELATED APPLICATIONS

This application is a non-provisional of and claims the benefit of U.S. Provisional Patent Application No. 63/032,435, filed on May 29, 2020, the entire contents of which are incorporated herein by reference.

FIELD OF THE INVENTION

The present disclosure relates to flush valves and, more particularly, to a bracket for a flush valve.

BACKGROUND

Automated flush valves generally include a motor in connection with a drive train. During assembly, it is common for the gears within the drive train to require manual positioning and adjustment by the user in order to properly align the gears.

SUMMARY

In one aspect, the disclosure provides a flush valve assembly including a manifold including an inlet, an outlet, and a fluid passageway positioned between the inlet and the outlet, a motor coupled to the manifold and including a drive gear, a valve cartridge coupled to the manifold, a shaft extending from the valve cartridge, the shaft including a valve gear configured to mesh with the drive gear, wherein rotational motion from the motor is transferred through the drive gear, the valve gear, and the valve shaft to rotate the valve cartridge between a first position and a second position and a bracket removably coupled to the manifold, wherein the bracket is configured to align the drive gear and the valve gear in a predetermined position.

In another aspect, the disclosure provides a flush valve assembly including a manifold assembly including an inlet, an outlet, and a fluid passageway positioned between the inlet and the outlet, a motor having a drive gear, a valve cartridge coupled to the manifold, a shaft extending from the valve cartridge and including a valve gear configured to mesh with the drive gear, and a bracket removably coupled to the manifold, wherein the bracket includes a first aperture configured to receive a portion of the motor, a second aperture configured to receive the valve cartridge, wherein the first and second apertures align the drive gear and the valve gear in a predetermined position, and a groove configured to receive a portion of the motor.

In yet another aspect, the disclosure provides a method of assembling a flush valve assembly, the flush valve assembly including a manifold, a motor coupled to the manifold and including a drive gear, a valve cartridge coupled to the manifold, a shaft extending from the valve cartridge, the shaft including a valve gear configured to mesh with the drive gear, the method including aligning a first aperture of a bracket with the motor of the flush valve assembly, aligning an opening of the bracket with the valve cartridge of the flush valve assembly, positioning the bracket onto the manifold of the flush valve assembly, wherein the motor protrudes through the first aperture of the bracket and a portion of the valve cartridge protrudes through the opening of the bracket, securing the bracket to the manifold, securing the drive gear to the motor, securing the valve gear to the shaft of the valve cartridge, and securing a sensor assembly to the motor of the flush valve assembly.

Other aspects of the disclosure will become apparent by consideration of the detailed description and accompanying drawings.

BRIEF DESCRIPTION OF THE DRAWINGS

FIG. 6b is a front view of the valve cartridge of FIG. 6a.

DETAILED DESCRIPTION

Figure 1:
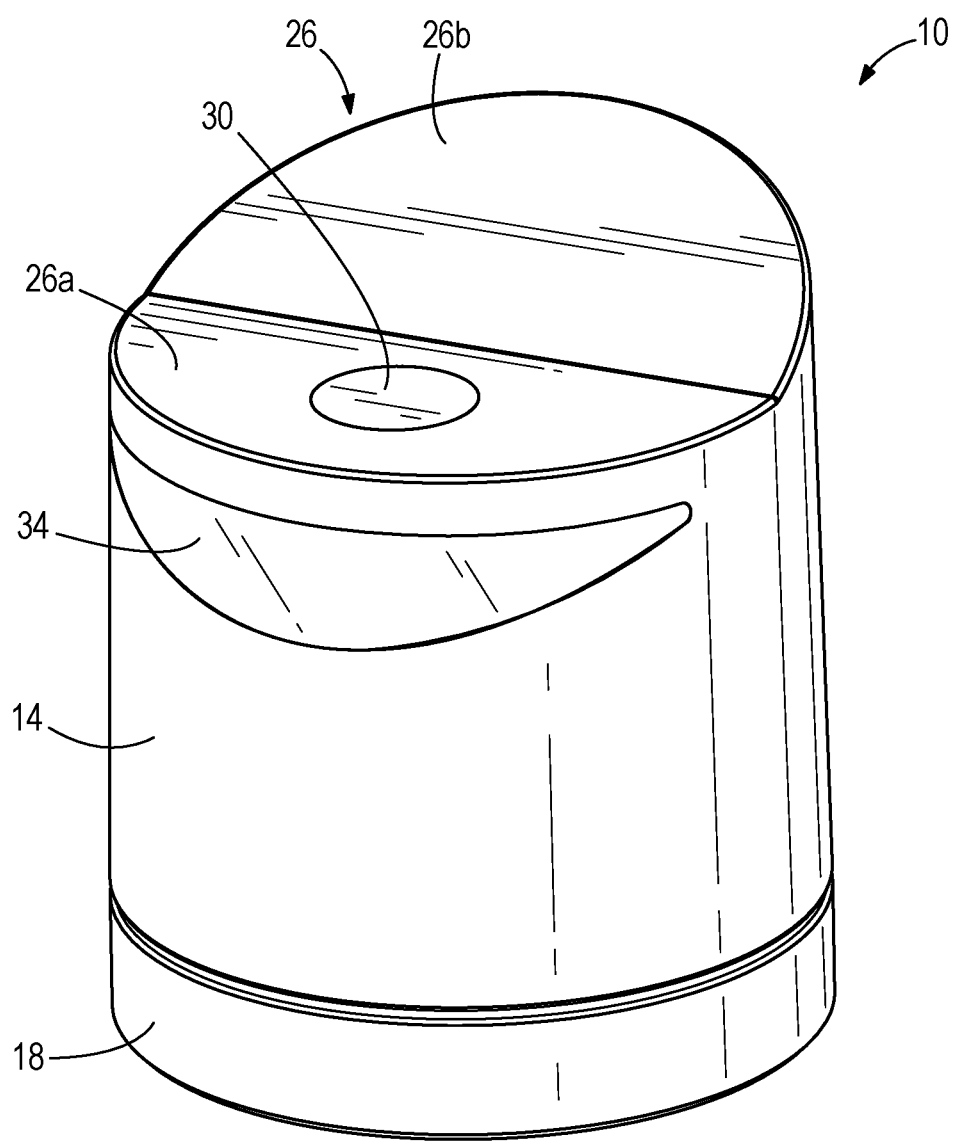
FIG. 1 is a perspective view of a flush valve assembly embodying the invention.
Figure 2:
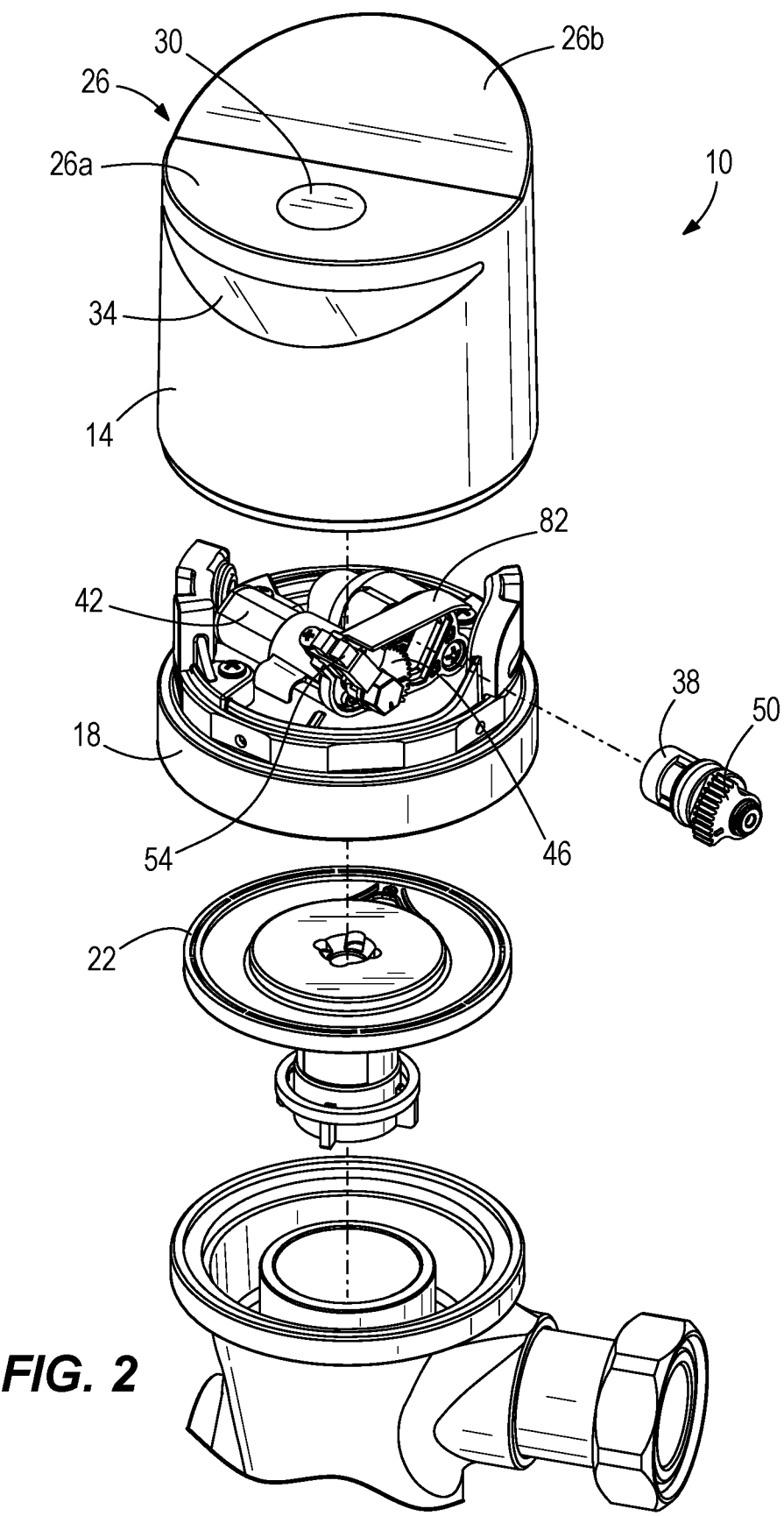
FIG. 2 is an exploded view of the flush valve assembly of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-4 illustrate a flush valve assembly 10. The flush valve assembly 10 includes a housing 14, a manifold assembly 18, and a diaphragm 22. The housing 14 is generally cylindrical and includes a chamber, which receives the manifold assembly 18 and the diaphragm 22. A cover 26 of the housing 14 includes a front portion 26a and a back portion 26b, which is angled relative to the front portion 26a. The front portion 26a of the cover 26 includes a manual override actuator 30, which enables a user to manually operate the flush valve assembly.

The housing 14 additionally includes a power source (e.g. a battery pack, etc.), a controller, and a sensor assembly 34. The sensor assembly 34 is positioned on the housing 14, under the front portion 26a of the cover 26, such that the sensor assembly 34 may detect the presence of a user.

Figure 3:
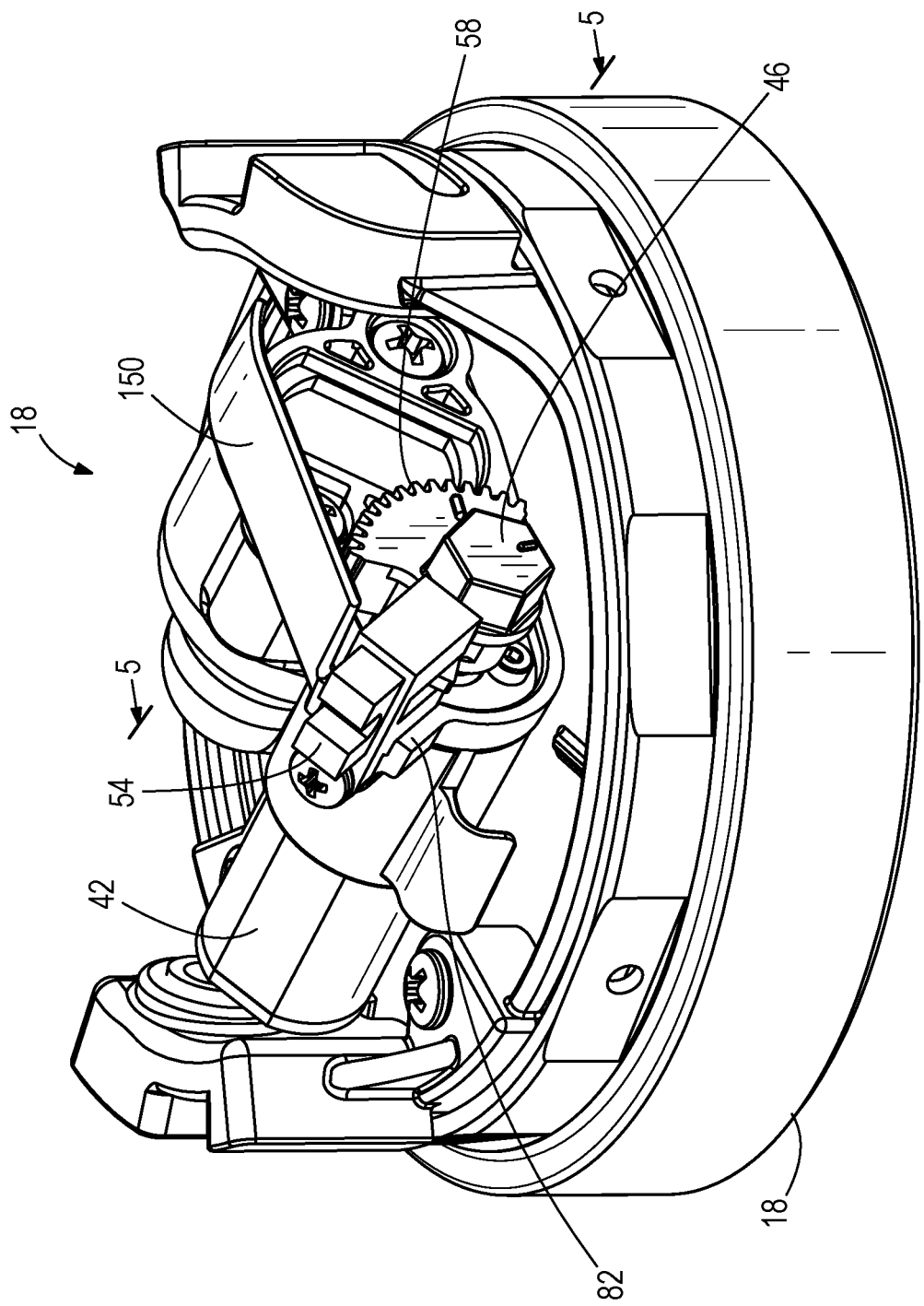
FIG. 3 is perspective view of a manifold assembly of the flush valve assembly of FIG. 1.
Figure 4:
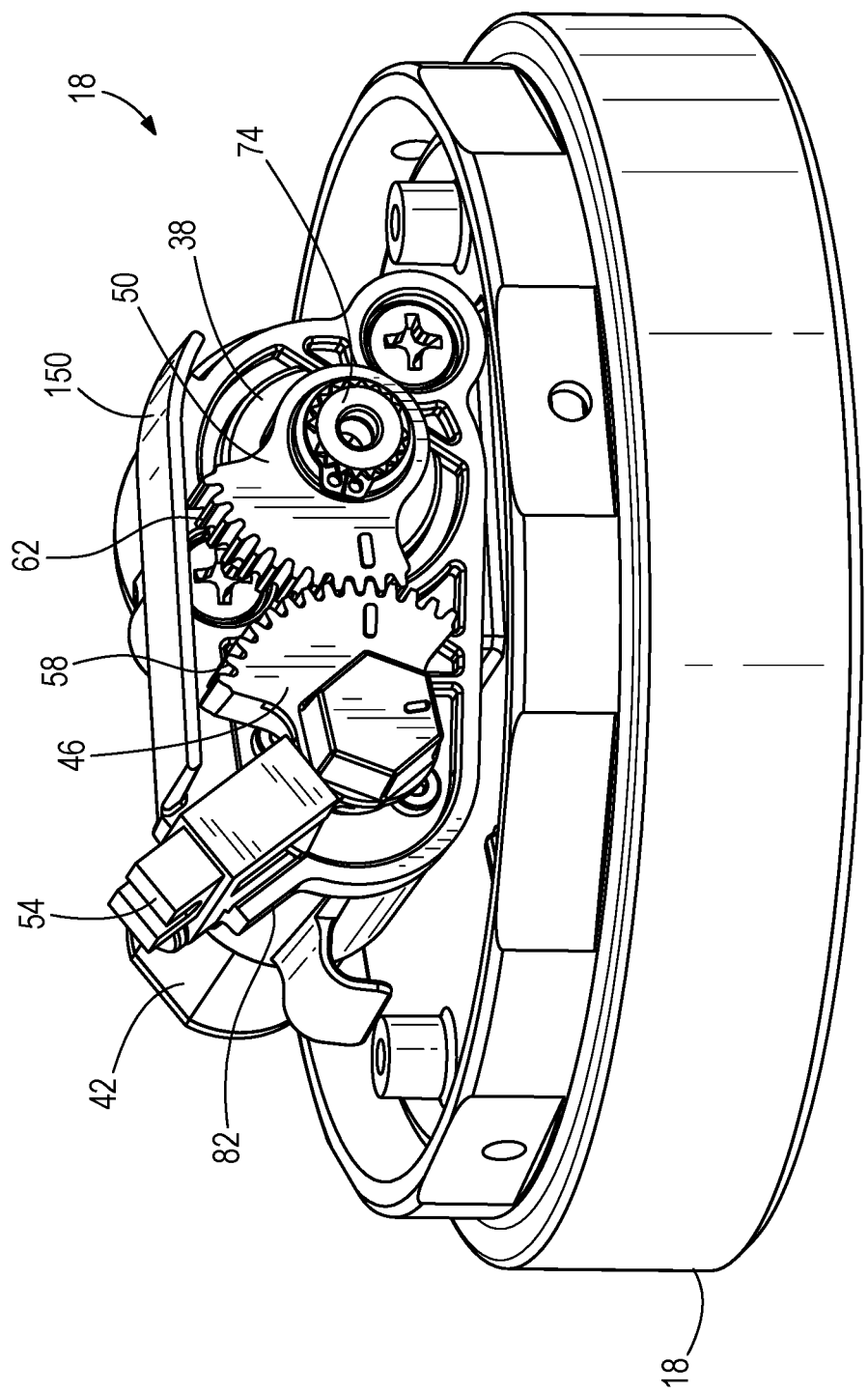
FIG. 4 is another perspective view of the manifold assembly of the flush valve assembly of FIG. 1.
Figure 5:
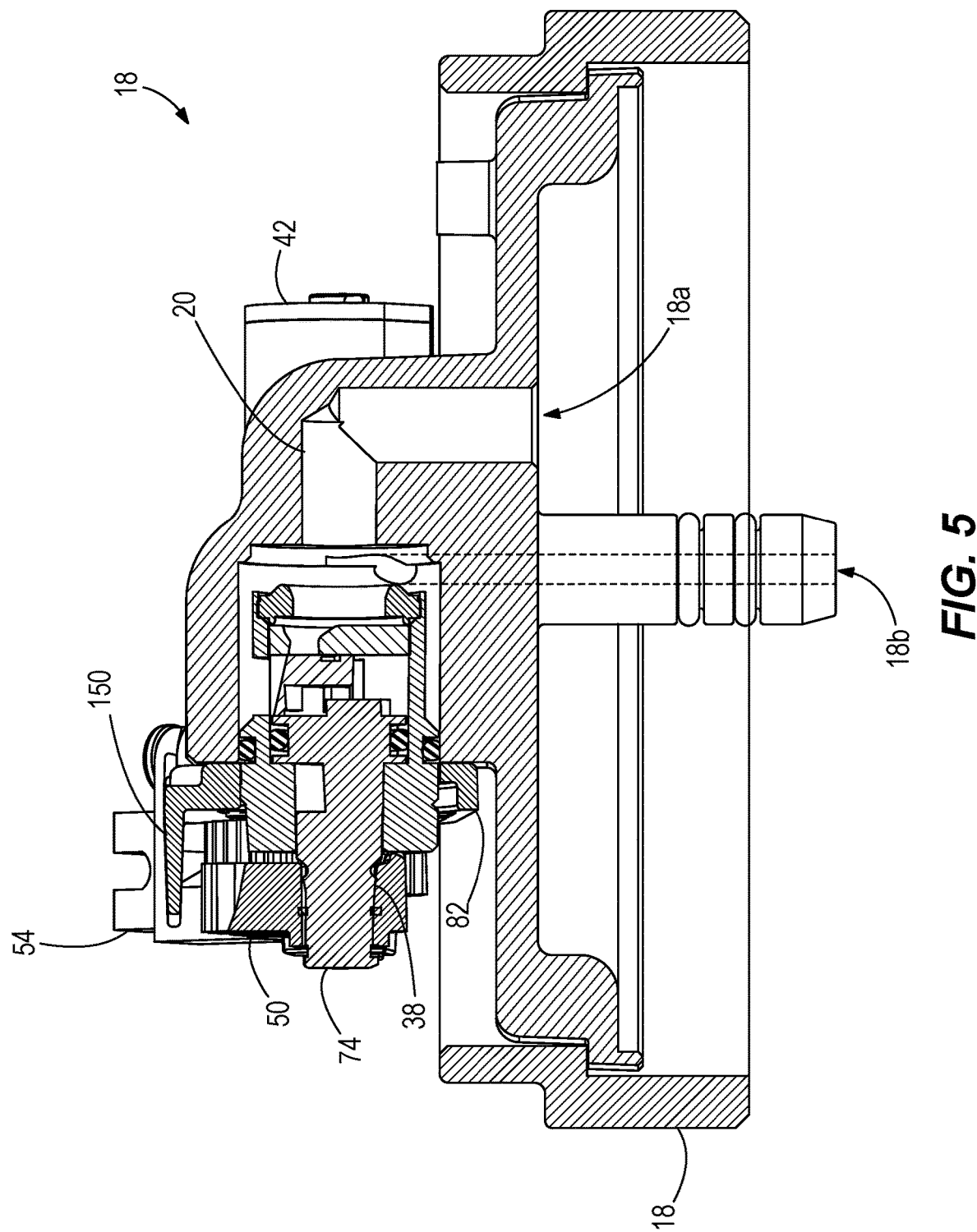
FIG. 5 is a cross-sectional view of the manifold assembly of the flush valve assembly of FIG. 4.

With reference to FIGS. 3-5, the manifold assembly 18 defines a fluid passageway 20 between a fluid inlet 18a and a fluid outlet 18b. The manifold assembly 18 additionally includes a valve cartridge 38, a motor 42, a drive gear 46, a valve gear 50, and a sensor 54. The fluid inlet 18a provides fluid communication to the valve cartridge 38, which provides selective fluid communication from the fluid inlet 18a to the fluid outlet 18b via the fluid passageway 20. The fluid outlet 18b extends downwardly away from the manifold assembly 18.

Figure 6B:
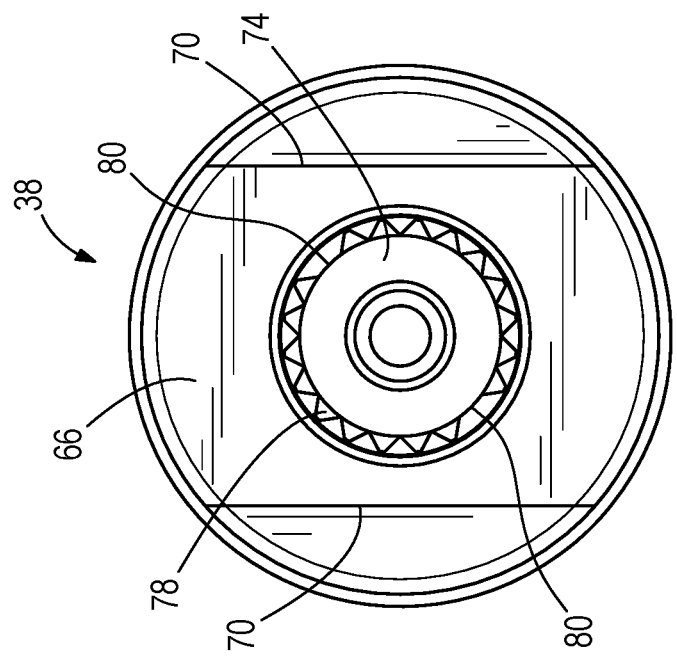
Figure 6A:
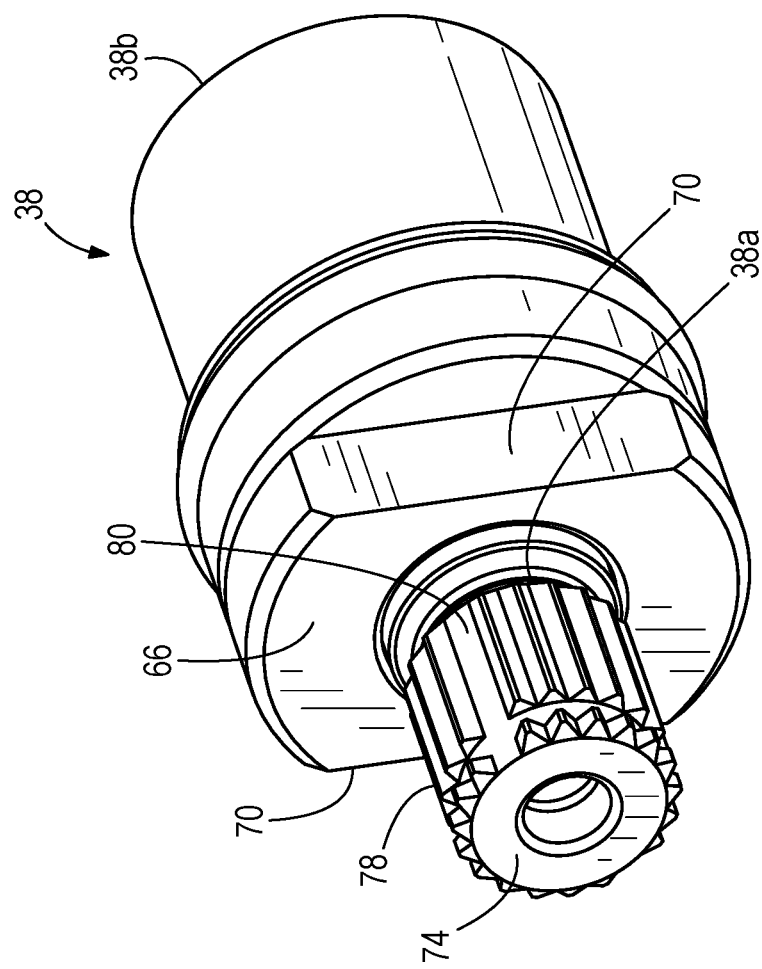
FIG. 6a is a perspective view of a valve cartridge of the flush valve assembly of FIG. 1.

With reference to FIGS. 6a and 6b, the valve cartridge 38 is generally cylindrical and includes a first end 38a, and a second end 38b opposite the first end 38a. The first end 38a of the cartridge 38 includes a contact surface 66, which is cylindrical and includes two flats 70. The flats 70 are positioned on opposite sides of the contact surface 66 and extend parallel to each other. A valve shaft 74 extends from the contact surface 66, such that the valve gear 50 is coupled to the cartridge 38 via the valve shaft 74. The valve shaft 74 is generally cylindrical and includes splines 78 equidistantly spaced around a circumference of the shaft 74. The splines 78 are non-continuous such that the valve shaft 74 includes gaps 80 positioned between adjacent splines 78. In the illustrated embodiments, the valve shaft 74 includes two gaps 80, which are positioned on opposite sides of the valve shaft 74. In alternative embodiments, the valve shaft 74 may include additional or fewer gaps 80. The valve gear 50 includes splines corresponding to the splines 78 on the valve shaft 74, and two protrusions corresponding to the gaps 80 on the valve shaft 74. The splines and protrusions of the valve gear 50 allow for specific alignment of the valve gear 50 onto the valve shaft 74.

With reference to FIGS. 3-4, the motor 42 is coupled to the drive gear 46 via a motor shaft. The motor 42 may be a direct current (DC), reversible motor that may comprise a planetary metal gearbox. The motor 42 is coupled to the drive gear 46 via a splined connection, such that rotation of the motor 42 translates to rotation of the drive gear 46. The drive gear 46 includes a flag (not shown) that extends outwardly from a body of the drive gear 46, the flag can take any appropriate shape so that the flag can indicate the rotational position of the drive gear 46 via the sensor 54. In the illustrated embodiments, the drive gear 46 is a wedge gear including teeth 58 positioned radially around 90 degrees of the drive gear 46.

The sensor 54 is positioned adjacent the drive gear 46 to receive at least a portion of the flag in a gap of the sensor 54. In the illustrated embodiments, the sensor 54 is an optical sensor that emits a beam across the gap. When the flag is at least partially positioned in the gap of the sensor 54, the flag can interrupt the beam of the sensor 54 to indicate a position of the drive gear 46, which may be correlated to the open position of the valve cartridge 38. In other embodiments, the interruption of the beam of the sensor 54 can indicate the closed position of the valve cartridge 38.

The valve gear 50 is positioned to contact and intermesh with the drive gear 46, which drives the valve gear 50. The valve gear 50 includes a shape and size similar to the shape and size of the drive gear 46. In the illustrated embodiments, the valve gear 50 is a wedge gear including teeth 62 positioned radially around 90 degrees of the valve gear 50. The valve gear 50 is coupled to the valve shaft 74 (FIG. 4) via a splined connection, such that the valve shaft 74 extends from the valve cartridge 38. The valve shaft 74 controls the rotational position of at least one valve element (not shown) in the valve cartridge 38 between an open position and a closed position to regulate fluid flow. Due to the wedged shape of the drive gear 46 and the valve gear 50, the valve cartridge 38 may be operable as a quarter-turn valve.

In alternative embodiments, the flag extends from the valve gear 50 and indicates the rotational position of the valve gear 50, thereby indicating an open or closed position of the valve cartridge 38, as described above. In such instances, the sensor 54 is positioned adjacent the valve gear 50 to be able to operate in a similar manner as described above.

The flush valve assembly 10 transfers rotational motion from the motor 42 through the drive gear 46, the valve gear 50, and the valve shaft 74 to selectively drive the valve cartridge 38 between the open position and the closed position. As described above, the motor 42 is reversible and generates rotational motion in a first direction to place the valve cartridge 38 in the open position, and the motor 42 generates rotational motion in a second direction opposite the first direction to place the valve cartridge 38 in the closed position.

In the open position, the flag can be positioned on a first side of a beam of the sensor 54 such that the sensor 54 indicates the valve cartridge 38 is in an open position. In the open position, the valve cartridge 38 provides fluid communication between the fluid inlet 18*a* and the fluid outlet 18*b* through the valve cartridge 38 and the fluid passageway 20. In the closed position, the flag can be positioned on a second, opposite, side of the beam of the sensor 54 such that the sensor 54 indicates the valve cartridge 38 is in the closed position. In some embodiments, the flag may be positioned in the gap of the sensor 54 when in the open position, and the flag may be positioned outside the gap of the sensor 54 when in the closed position. In the closed position, the valve cartridge 38 prevents fluid from flowing between the fluid inlet 18*a* and the fluid outlet 18*b*. In alternative embodiments, the open position and the closed position can be switched such that the presence of the flag in the gap of the sensor 54 can indicate the closed position and the absence of the flag in the gap can indicate the open position.

The sensor 54 and the motor 42 are in connection with the controller to execute a flush cycle. The cycle includes instructing the motor 42 to initiate rotational motion in a first direction, identifying the valve cartridge 38 is in the open position when the flag interrupts the sensor 54 to indicate a position of the drive gear 46 correlated to the open position, and instructing the motor 42 to stop rotational motion when the open position is identified. These steps can place the flush valve assembly 10 in the open position.

Figure 7:
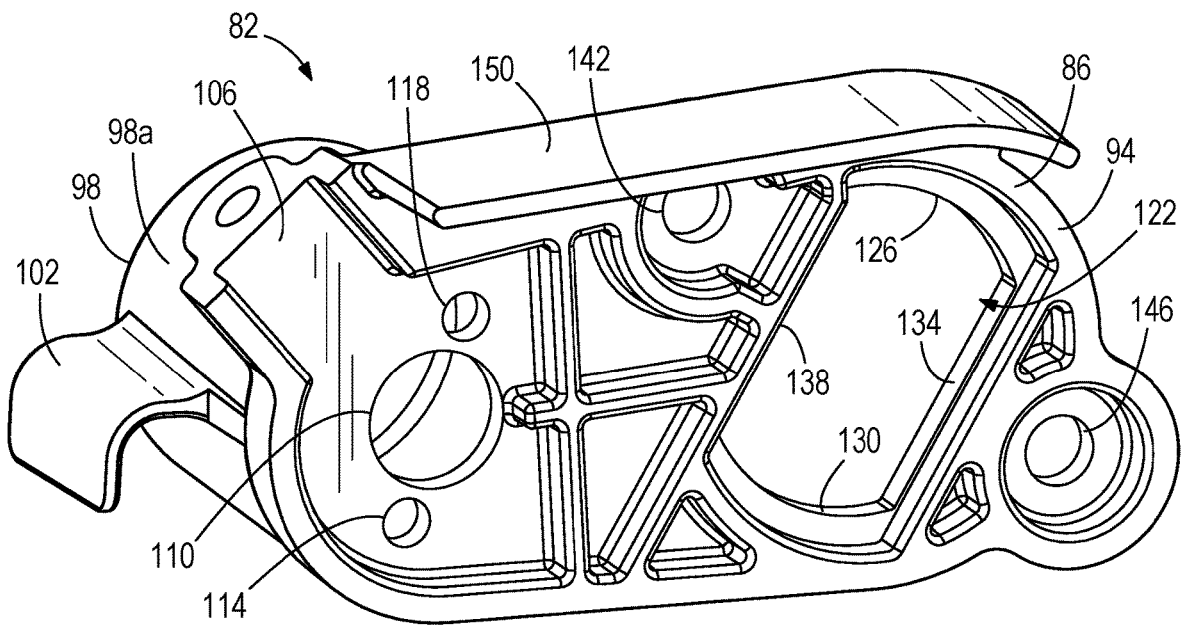
FIG. 7 is a perspective view of a bracket coupled to the flush valve assembly of FIG. 1.
Figure 8:
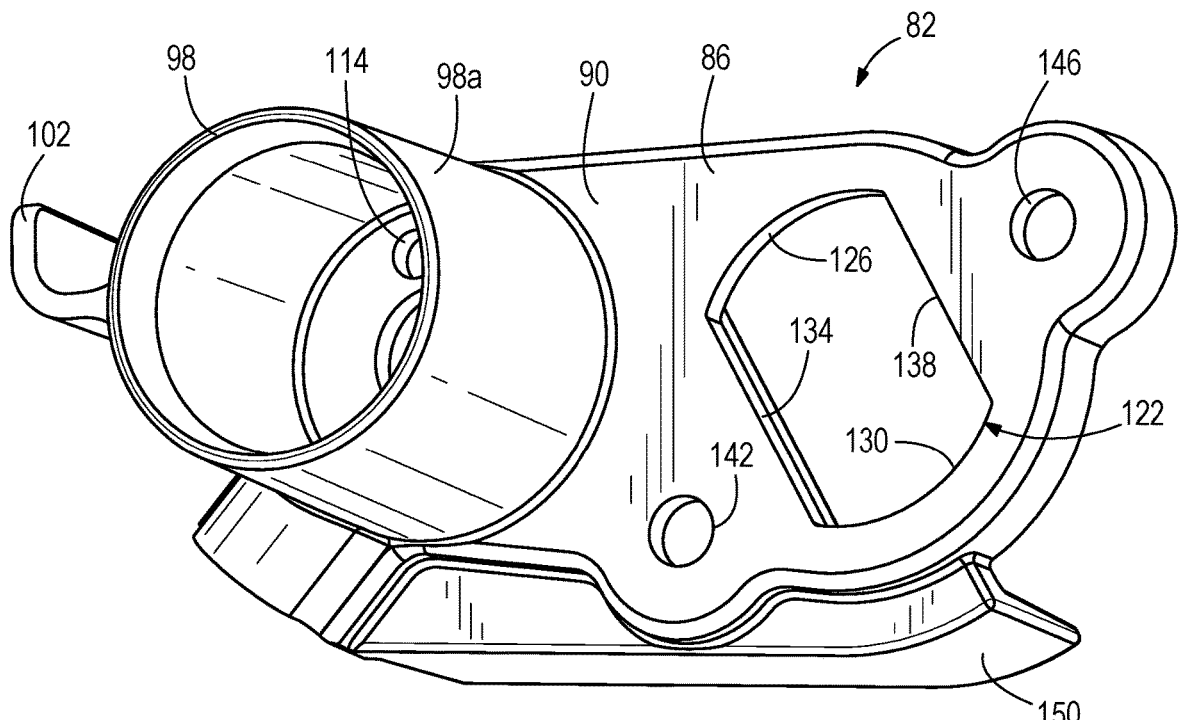
FIG. 8 is another perspective view of the bracket of FIG. 7.
Figure 9:
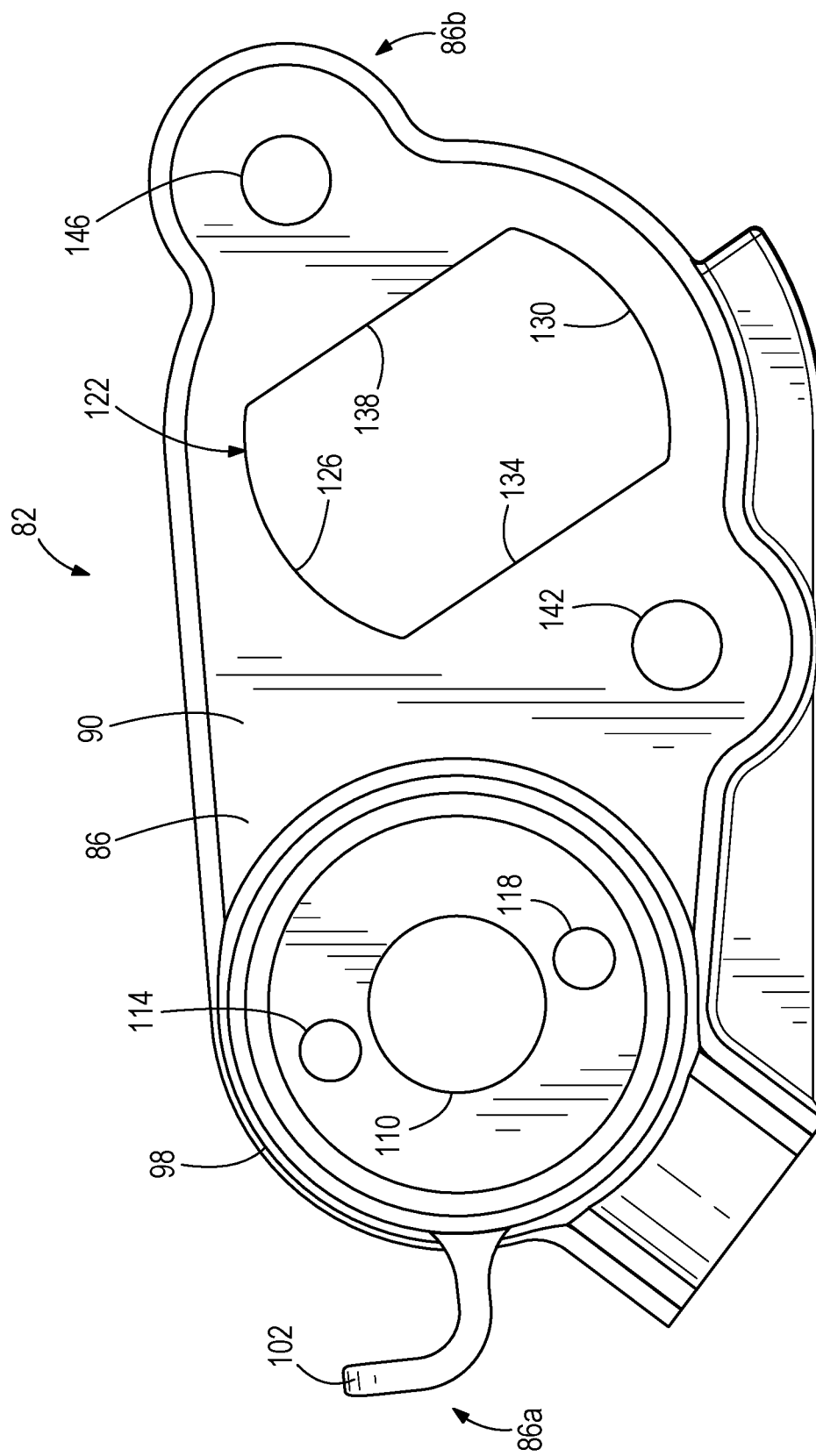
FIG. 9 is a top view of the bracket of FIG. 7.

With reference to FIGS. 7-9, a bracket 82 is removably coupled to the manifold assembly 18 of the flush valve assembly 10. The bracket 82 includes a body 86 having a first end 86*a*, a second end 86*b* opposite the first end 86*a*, a first face 90, and a second face 94 opposite the first face 90. The first face 90 of the body 86 is generally flat. The second face 94 of the body 86 is shaped to receive a portion of the manifold assembly 18.

With reference to FIG. 8, the first face 90 of the bracket 82 includes a cylinder 98 extending therefrom. The cylinder 98 is positioned adjacent the first end 86*a* of the bracket 82 and is sized to partially enclose the motor 42. The cylinder 98 includes a flange 102 positioned adjacent to the first end 86*a* of the bracket 82 and extending from an outer surface 98*a* of the cylinder 98. The flange 102 includes a curved surface, allowing the flange 102 to act as a wire management guide for the manifold assembly 18. More specifically, wires extending from the manifold assembly 18 may be contained within the curved surface, thereby preventing the wires from interfering with the components of the manifold assembly 18. In some embodiments, the flange 102 may include alternative shapes and sizes. The flange 102 also provides a guide to easily remove and replace the housing 14 without getting the wires caught between the housing 14 and the manifold assembly 18.

The second face 94 of the body 86 includes a groove 106 positioned adjacent to the first end 86*a* of the bracket 82. The groove 106 is shaped and size to at least partially receive the motor shaft, the drive gear 46, and the sensor 54. The bracket 82 further includes a first cylindrical aperture 110 extending through the bracket 82. The first cylindrical aperture 110 is positioned approximately aligned with the center of the groove 106 and is concentrically positioned within a circumference of the cylinder 98. In other words, the aperture 110 has a smaller diameter than a diameter of the cylinder 98. The first aperture 110 is sized to receive a portion of the motor 42. The bracket 82 additionally includes a second aperture 114 and a third aperture 118 extending through the body 86, adjacent the first cylindrical aperture 110. The second and third apertures 114, 118 are cylindrical and include a diameter smaller than a diameter of the first cylindrical aperture 110. The second and third apertures 114, 118 are positioned on opposite sides of the first cylindrical aperture 110 and are sized to receive fasteners, which secure the motor 42 to the bracket 82. More specifically, the second and third apertures 114, 118 extend through the body 86 within the circumference of the cylinder 98.

The bracket 82 includes an opening 122 positioned adjacent the second end 86b of the bracket 82. The opening 122 is shaped and sized to receive the contact surface 66 of the valve cartridge 38. Specifically, the opening 122 includes a perimeter defining a first curved edge 126, a second curved edge 130 extending opposite to the first curved edge 126, a first straight edge 134, and a second straight edge 138 extending opposite to the first straight edge 134. When the contact surface 66 of the valve cartridge 38 is positioned in the bracket 82, the flats 70 of the contact surface 66 engage the first and second straight edges 134, 138 of the opening 122. The bracket 82 additionally includes a fourth aperture 142 and a fifth aperture 146 extending through the bracket 82, adjacent the opening 122. The fourth and fifth apertures 142, 146 are positioned on opposite sides of the opening 122 and are sized to receive fasteners, which secure the valve cartridge 38 to the manifold assembly 18.

With continued reference to FIGS. 7-8, the bracket 82 additionally includes an elongate projection 150 extending along an edge of the body 86 of the bracket 82. The projection 150 extends outward, past the second face 94 of the bracket 82 (and opposite the direction the cylinder 98 extends from the body 86). When the bracket 82 is coupled to the manifold assembly 18, the projection 150 blocks a user from accessing components of the manifold assembly 18 (e.g., the drive gear 46, the valve gear 50, etc.), thereby preventing injuries during operation, servicing, and manufacturing.

During positioning of the bracket 82 onto the manifold assembly 18, the user aligns the first aperture 110 with the motor 42 and the opening 122 with the valve cartridge 38. The user rotates the valve cartridge 38 (including the valve shaft 74) until the flats 70 on the contact surface 66 of the valve cartridge 38 align with the first and second straight edges 134, 138 of the opening 122. The user slides the bracket 82 onto the manifold assembly 18, causing the motor 42 to protrude through the aperture 110 and the contact surface 66 of the cartridge 38 to protrude through the opening 122. Once the bracket 82 is positioned on the manifold assembly 18, fasteners are inserted through the apertures 114, 118, 142, 146, thereby securing the bracket 82 to the motor 42 and the manifold assembly 18. The user then secures the drive gear 46 to the motor shaft, the valve gear 50 to the valve shaft 74, and the sensor 54 to the motor 42. When positioning the valve gear 50 onto the valve shaft 74, the protrusions on the valve gear 50 fit into the corresponding gaps 80 of the valve shaft 74, thereby allowing the splines on the valve gear 50 and the valve shaft 74 to mesh. In such a position, the valve gear 50 can be aligned with the drive gear 46 and the flush valve assembly 10 may be operated.

The specific preset position of the valve cartridge 38 relative to the bracket 82, and the preset position of the valve gear 50 relative to the valve shaft 74 arranges the gears 46, 50 for alignment. When positioned in the open position, the drive gear 54 will engage the valve gear 50 at an optimal time for the gears 46, 50. Rotation of the drive gear 46 is continued until a mechanical stop of the valve cartridge 38 prevents further rotation, resulting in an optimal starting position for operation of the flush valve 10. The starting position set forth by the bracket 82 optimizes the timing of the gears 46, 50 for operation. Therefore, the bracket 82 eliminates the need for a user to interpret the correct alignment of the gears 46, 50 in a specific position.

Various features and advantages of certain embodiments are set forth in the following claims.

What is claimed is:

1. A flush valve assembly comprising:
a manifold including an inlet, an outlet, and a fluid passageway positioned between the inlet and the outlet;
a motor indirectly coupled to the manifold and including a drive gear;
a valve cartridge coupled to the manifold;
a shaft extending from the valve cartridge, the shaft including a valve gear configured to mesh with the drive gear, wherein rotational motion from the motor is transferred through the drive gear, the valve gear, and the valve shaft to rotate the valve cartridge between a first position and a second position; and
a bracket removably coupled to the manifold, wherein the bracket is configured to align the drive gear and the valve gear in a predetermined position, and wherein the bracket includes a first aperture configured to receive a portion of the motor and a second aperture configured to receive a portion of the valve cartridge.

2. The flush valve assembly of claim 1, further comprising a sensor positioned adjacent the drive gear, wherein the sensor is configured to receive at least a portion of drive gear.

3. The flush valve assembly of claim 1, wherein when the valve cartridge is in the first position, the valve cartridge provides fluid communication between the inlet and the outlet through the valve cartridge and the fluid passageway, and when the valve cartridge is in the second position, the valve cartridge prevents fluid flow between the inlet and the outlet.

4. The flush valve assembly of claim 1, wherein the drive gear includes a first plurality of splines and the valve gear includes a second plurality of splines, and wherein when the drive gear and the valve gear are in the predetermined position, the first plurality of splines mesh with the second plurality of splines.

5. The flush valve assembly of claim 1, wherein the first and second apertures align the drive gear and the valve gear in the predetermined position.

6. The flush valve assembly of claim 1, wherein the bracket includes a cylindrical portion configured to align with a portion of the motor.

7. The flush valve assembly of claim 1, wherein the bracket incudes a groove configured to receive a portion of the motor.

8. A flush valve assembly comprising:
a manifold assembly including an inlet, an outlet, and a fluid passageway positioned between the inlet and the outlet;
a motor indirectly coupled to the manifold and having a drive gear;
a valve cartridge coupled to the manifold;
a shaft extending from the valve cartridge and including a valve gear configured to mesh with the drive gear; and
a bracket removably coupled to the manifold, wherein the bracket includes a first aperture configured to receive a portion of the motor, a second aperture configured to receive the valve cartridge, wherein the first and second apertures align the drive gear and the valve gear in a predetermined position, and a groove configured to receive a portion of the motor.

9. The flush valve assembly of claim 8, further comprising a plurality of third apertures configured to receive fasteners to couple the bracket to the manifold.

10. The flush valve assembly of claim 8, wherein the bracket includes a cylindrical portion configured to align with a portion of the motor.

11. The flush valve assembly of claim 10, wherein the first aperture is concentrically positioned within a circumference of the cylindrical portion.

12. The flush valve assembly of claim 8, wherein the bracket includes a curved flange extending from a side of the bracket.

13. The flush valve assembly of claim 8, wherein the bracket includes a projection extending along an edge of the bracket, wherein when the bracket is coupled to the manifold, the projection is configured to cover at least a portion of the drive gear and the valve gear.

14. The flush valve assembly of claim 8, wherein the second aperture includes a flat edge configured to receive a corresponding flat portion of the valve cartridge.

15. The flush valve assembly of claim 8, wherein the first aperture is positioned within the groove.

16. A method of assembling a flush valve assembly, the flush valve assembly including a manifold, a motor indirectly coupled to the manifold and including a drive gear, a valve cartridge coupled to the manifold, a shaft extending from the valve cartridge, the shaft including a valve gear configured to mesh with the drive gear, the method comprising:

aligning a first aperture of a bracket with the motor of the flush valve assembly;

aligning an opening of the bracket with the valve cartridge of the flush valve assembly;

positioning the bracket onto the manifold of the flush valve assembly, wherein the motor protrudes through the first aperture of the bracket and a portion of the valve cartridge protrudes through the opening of the bracket;

securing the bracket to the manifold;

securing the drive gear to the motor;

securing the valve gear to the shaft of the valve cartridge; and securing a sensor assembly to the motor of the flush valve assembly.

17. The method of claim 16, further comprising, after securing the valve gear to the shaft of the valve cartridge, aligning the valve gear with the drive gear.

18. The method of claim 16, wherein aligning an opening of the bracket with the valve cartridge of the flush valve assembly further includes rotating the valve cartridge until flats on the valve cartridge align with corresponding edges on the opening of the bracket.

19. The method of claim 16, wherein securing the valve gear to the shaft of the valve cartridge further includes positioning protrusions of the valve gear within corresponding gaps of the valve shaft.

\* \* \* \* \*